(No Model.) 2 Sheets—Sheet 1.
A. SPRINGER.
ROTATING MOTOR.
No. 485,235. Patented Nov. 1, 1892.
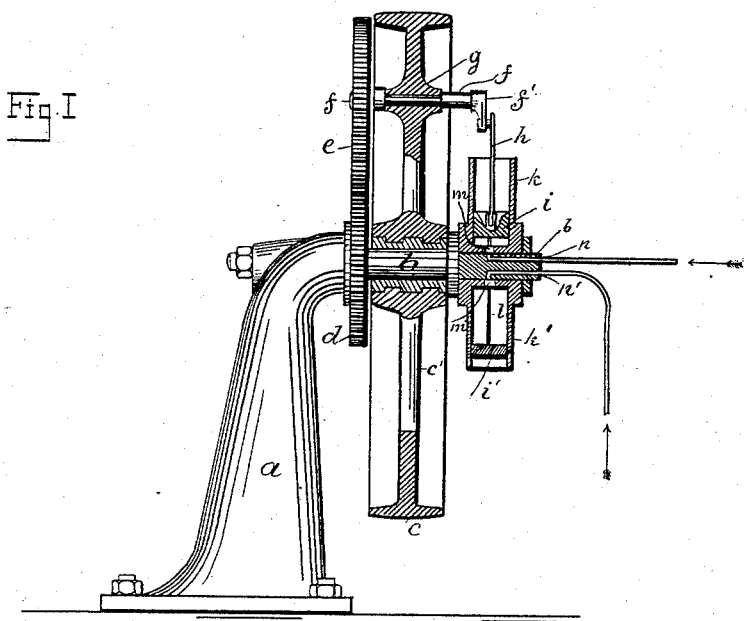
Fig. I
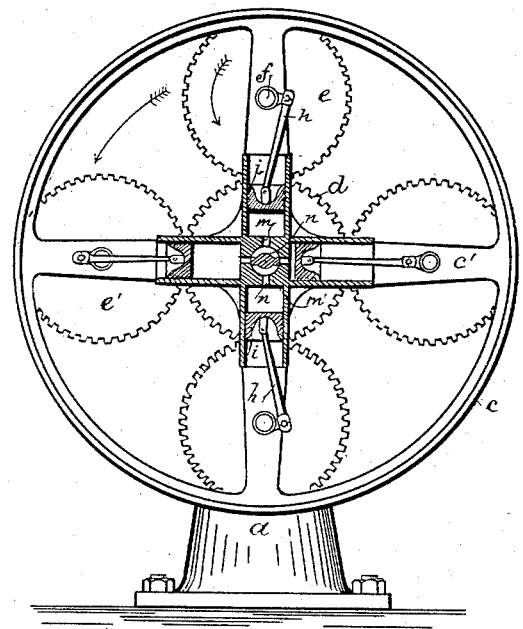
Fig. II.
Attest
Walter Donaldson
F. L. Middleton
Inventor
Anton Springer
by Ellis Spear
Atty.
THE NORRIS PETERS CO., PHOTO-LITHO., WASHINGTON, D. C.

(No Model.) 2 Sheets—Sheet 2.
A. SPRINGER.
ROTATING MOTOR.
No. 485,235. Patented Nov. 1, 1892.
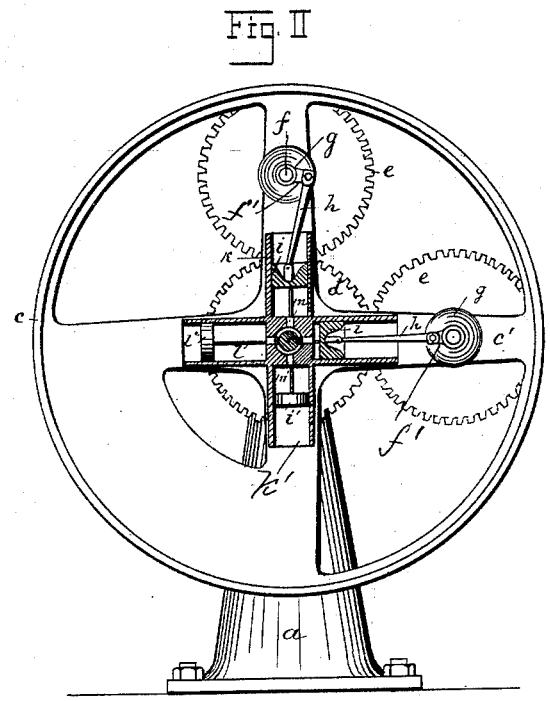
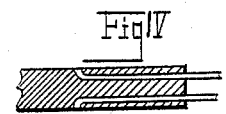
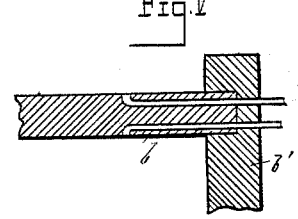
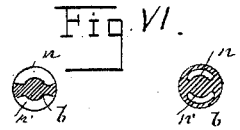
Attest
Inventor
Anton Springer
by Ellis Spear
Atty.

UNITED STATES PATENT OFFICE.

ANTON SPRINGER, OF KASTEN, AUSTRIA-HUNGARY.

ROTATING MOTOR.

SPECIFICATION forming part of Letters Patent No. 485,235, dated November 1, 1892.

Application filed November 21, 1891. Serial No. 412,700. (No model.)

*To all whom it may concern:*

Be it known that I, ANTON SPRINGER, of Kasten, in the Province of Lower Austria, in the Empire of Austria-Hungary, have invented a new and useful Rotating Motor, of which the following is a specification, reference being had therein to the accompanying drawings.

This invention relates to steam and other fluid-pressure engines which have rotating cylinders.

I will describe my improvements with reference to the accompanying drawings, in each of the figures of which similar parts or details are denoted by similar letters of reference.

In the drawings, Figure I is a simple form of the engine shown in sectional side elevation. Fig. II is a front sectional view of the engine shown in Fig. I, with four cylinders instead of two. Fig. III is a sectional front view showing a modification of the construction illustrated by Fig. II. Figs. IV, V, and VI are detail views of the arrangement of the steam-ports.

The engine illustrated by Figs. I and II consists, essentially, of the stand or support $a$, to which the horizontal spindle $b$ is fitted. This spindle may be arranged to rotate or it may be fixed. If fixed, the toothed wheel $d$ is also fixed upon the spindle $b$. If, on the contrary, the spindle is free to rotate in its bearing in the stand $a$, then the spur-wheel $d$ is firmly secured to the fixed part of the frame so that it cannot rotate. The fixed spur-wheel $d$ gears with a second similar wheel $e$, mounted upon the end of the spindle $f$, through which it is driven. This spindle has its journal in a bearing formed in the strengthened part $g$ of the arm or spoke $c'$ of the wheel $c$. The other part of the spindle $f$ is provided with a crank $f'$, which is connected with the piston-rod $h$ of the piston $i$, which moves in the open-topped cylinder $k$. Below the cylinder $k$ and in line with it there is a second cylinder $k'$, which is also open-topped, and which contains the piston $i'$, firmly connected to the piston $i$ in the cylinder $k$ by means of the stiff rods $l$. The connection of the two pistons is effected in such a manner that the piston $i$ is in its lowest position or nearest to the axis of the engine when the opposite piston $i'$ is in its highest position or farthest from the axis. The steam or other fluid is admitted to the engine through the port $n$ and an opening $m$, formed in the bottom of the cylinder. From the construction it will be obvious that the operating-fluid can gain admittance to the under side of the piston in the cylinder only when the inlet $m$ is in communication with the port $n$, and that during the rotation of the engine steam will be admitted to the cylinders alternately, there being an opening in the lower part of the cylinder $k'$ precisely corresponding with that in the bottom of the cylinder $k$. Diametrically opposite to the inlet-port $n$ there is an exhaust-port $n'$, which communicates with the openings in the bottom of the cylinders during their rotation. Thus once for each revolution the interior of the cylinder will be open to the admission and to the exhaust.

The action of the engine is as follows: The engine being in the position represented by Figs. 1 and 2, steam finds its way through the port $n$ and opening $m$ below the piston $i$, which is then lifted with its piston-rod $h$ and turns the crank $f'$. The motion of the crank rotates the wheel $e$; but this wheel being in gear with the fixed wheel $d$ cannot cause the latter to rotate, and consequently the engine is rotated around the spindle $b$. The cylinder $k$ then comes to the position formerly occupied by the cylinder $k'$ and the steam or fluid in $k$ escapes through $n'$, while live steam or fluid is admitted to the second cylinder $k'$ in its turn. Constant rotation is effected by the succession of these motions. The engine may, if desired, be arranged to work expansively by a suitable construction and arrangement of the ports $n\ n'$ and the openings $m\ m'$, as will be obvious to engineers. This arrangement is very simple and convenient and permits the engine to be readily taken to pieces for any necessary repairs, and it also reduces the wear and tear to a minimum.

The modification represented by Figs. II and III is essentially the same as that shown by Fig. I, the difference being that two of the duplex cylinders and pistons are employed. In this modified construction with a suitable arrangement of the pistons the trouble which may be occasioned by dead-points is avoided.

The further arrangements and action of this modification do not require any description.

In the arrangement illustrated by Fig. III the only difference to that illustrated by Fig. II is that instead of the duplex cylinders and pistons four independent cylinders and pistons are employed and, consequently, also four of the cranks $f'$ and four wheels $e$.

The wheel $c$ may be employed for driving by means of suitable belts, or its periphery may be provided with teeth, so as to drive a pinion connected with the mechanism to be driven by the engine. It will be noticed that the spindle has a prolongation beyond the wheel C, which prolongation is fixed, whether it be joined directly to the spindle or detached therefrom.

I claim—

In combination, the standard, the spindle $b$, the wheel C thereon, the gearing between the said wheel C and the standard, the radial cylinders and pistons connecting with the gearing, and the means for supporting said cylinders and feeding the steam thereto, consisting of the prolongations of the spindle having ports extending inwardly from its end and then laterally, the said prolongation being fixed and connecting directly with the steam-pipes at its end and the said cylinders revolving freely about the fixed prolongations, substantially as described.

In testimony whereof I affix my signature in presence of two witnesses.

ANTON SPRINGER.

Witnesses:
W. B. MURPHY,
A. SCHLESSING.